United States Patent [19]
Vitomir

[11] Patent Number: 6,130,192
[45] Date of Patent: Oct. 10, 2000

[54] PAINT STRIPPER AND CLEANING COMPOSITIONS

[75] Inventor: Sergio Vitomir, New Westminister, Canada

[73] Assignee: Napier International Technologies, Inc., Langley, Canada

[21] Appl. No.: 09/366,867

[22] Filed: Aug. 4, 1999

[51] Int. Cl.[7] .................. C11D 1/72; C11D 3/20; C11D 3/30; C11D 3/43

[52] U.S. Cl. .................. 510/202; 510/174; 510/201; 510/210; 510/212; 510/407; 510/413; 510/421; 510/499; 510/505; 510/506

[58] Field of Search .................. 510/174, 201, 510/202, 210, 212, 407, 413, 421, 499, 505, 506

[56] References Cited

U.S. PATENT DOCUMENTS

| | | | |
|---|---|---|---|
| 3,355,385 | 11/1967 | Mackley | 134/2 |
| 3,979,219 | 9/1976 | Chang et al. | 106/271 |
| 4,120,810 | 10/1978 | Palmer | 510/212 |
| 4,269,724 | 5/1981 | Hodson | 510/204 |
| 4,683,157 | 7/1987 | Mosser et al. | 428/64.1 |
| 4,732,695 | 3/1988 | Francisco | 510/212 |
| 4,812,255 | 3/1989 | Suwala | 134/38 |
| 5,015,410 | 5/1991 | Sullivan | 510/208 |
| 5,106,525 | 4/1992 | Sullivan | 510/206 |
| 5,215,675 | 6/1993 | Wilkins et al. | 510/206 |
| 5,319,055 | 6/1994 | Sperry et al. | 528/49 |
| 5,346,640 | 9/1994 | Leys | 510/174 |
| 5,387,363 | 2/1995 | Distaso | 510/207 |
| 5,403,517 | 4/1995 | Horinishi et al. | 424/70.2 |
| 5,405,548 | 4/1995 | Distaso | 510/201 |
| 5,411,678 | 5/1995 | Sim | 510/206 |
| 5,425,893 | 6/1995 | Stevens | 134/1 |
| 5,427,710 | 6/1995 | Stevens | 134/1 |
| 5,454,985 | 10/1995 | Harbin | 510/206 |
| 5,518,661 | 5/1996 | Langford et al. | 252/364 |
| 5,542,986 | 8/1996 | Distaso | 134/38 |
| 5,569,410 | 10/1996 | Distaso | 510/202 |
| 5,629,277 | 5/1997 | Plishka | 510/202 |
| 5,728,666 | 3/1998 | Vitomir | 510/203 |
| 5,792,278 | 8/1998 | Wojcik | 134/38 |
| 5,922,668 | 7/1999 | Leonard et al. | 510/417 |

FOREIGN PATENT DOCUMENTS 2008593 7/1935 Spain.

*Primary Examiner*—Gregory R. Delcotto
*Attorney, Agent, or Firm*—Darby & Darby

[57] ABSTRACT

The present invention is directed to a composition comprising (a) an aromatic alcohol, such as benzyl alcohol; (b) an oxo-($C_6$–$C_{13}$ alkyl) acetate; and (c) dimethyl sulfoxide. A method for removing paint or a coating from a substrate by applying a paint stripper composition comprising an oxo-($C_6$–$C_{13}$ alkyl) acetate to the substrate is also provided. Another embodiment of the invention is a method for cleaning a substrate by applying the composition of the present invention to the substrate.

20 Claims, No Drawings

PAINT STRIPPER AND CLEANING COMPOSITIONS

FIELD OF THE INVENTION

This invention relates to compositions containing an oxo-($C_6$–$C_{13}$ alkyl) acetate and their use for cleaning and removing paints and coatings from substrates, such as polyacrylates and polycarbonates.

BACKGROUND OF THE INVENTION

There are many paint stripper compositions presently on the market for removing paint and, in particular, graffiti, from various substrates. For example, U.S. Pat. No. 5,346,640 discloses a cleaner composition comprising N-methylpyrrolidone, propylene carbonate, isocetyl alcohol, dipropylene glycol methyl ether acetate or dipropylene glycol monomethyl ether acetate, a thickening agent, and a surfactant.

U.S. Pat. No. 5,629,277 discloses a paint removing composition comprising an alkylene carbonate, propylene glycol, and a polypropylene glycol having a molecular weight of at least 200.

However, when these paint stripper compositions are applied to a polyacrylate or polycarbonate substrate, they frequently leave the substrate hazy or cloudy and result in considerable structural damage to the substrate.

Therefore, there is a need for a paint stripper composition which removes paints and coatings from polyacrylate substrates without hazing or clouding the substrates. There is also a continuing need for compositions which clean polymeric substrates, such as polyacrylate and polycarbonate substrates, without damaging the substrates.

SUMMARY OF THE INVENTION

The present inventors have discovered that cleaning and paint stripper compositions containing an oxo-($C_6$–$C_{13}$ alkyl) acetate effectively clean and remove paints and coatings from substrates, including polymeric substrates, such as polyacrylates, polyurethanes, and polycarbonates, without hazing or clouding the substrates. Furthermore, these compositions do not effect paints and coatings on metallic substrates, such as aircraft parts.

The present invention is directed to a composition comprising (a) an aromatic alcohol; (b) an oxo-($C_6$–$C_{13}$ alkyl) acetate; and (c) dimethyl sulfoxide. The composition of the present invention is free of chlorinated solvents, enviromnentally safe and user-friendly. It is also non-corrosive to substrates, non-flammable, non-toxic, low odor, and fully biodegradable.

Another embodiment of the invention is a method for removing paint or a coating from a substrate comprising applying a paint or coating removing effective amount of a composition comprising an oxo-($C_6$–$C_{13}$ alkyl) acetate to the substrate.

Yet another embodiment of the invention is a method for cleaning a substrate comprising applying a cleaning effective amount of the composition of the present invention to the substrate.

DETAILED DESCRIPTION OF THE INVENTION

The composition of the present invention comprises (a) (i) an aromatic alcohol having the formula

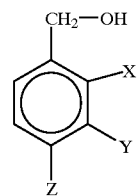

where X, Y, and Z are all hydrogen or two hydrogens and a methyl, (ii) an aromatic alcohol having the formula

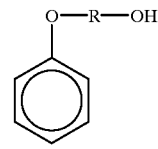

where R is ethylene, propylene, or isopropylene, or (iii) a mixture thereof; (b) an oxo-($C_6$–$C_{13}$ alkyl) acetate; and (c) dimethyl sulfoxide. The may be in liquid or gel form.

Suitable aromatic alcohols include, but are not limited to, benzyl alcohol, phenoxy propanol, phenoxy ethanol, and any combination of any of the foregoing. Preferably, the aromatic alcohol is benzyl alcohol. The composition typically comprises from about 3 to about 20% by weight and more preferably from about 5 to about 10% by weight of aromatic alcohol based upon 100% weight of total composition.

Without being bound to any theory, the inventors theorize that the oxo-($C6$–$C_{13}$ alkyl) acetate acts as a buffer and prevents the other ingredients of the composition from attacking polymeric substrates, such as polyacrylates and polycarbonates. The oxo-($C_6$–$C_{13}$ alkyl) acetate also reduces the surface tension of the composition. Preferably, the acetate is an oxo-($C_9$–$C_{11}$ alkyl) acetate and, more preferably, oxo-decyl acetate, such as Exxate 1000™ available from Exxon Chemical Co., of Houston, Tex. The composition typically comprises a substrate protective effective amount of oxo-($C_6$–$C_{13}$ alkyl) acetate. Preferably, the composition comprises from about 3 to about 50% by weight and more preferably from 5 to about 15% by weight of oxo-($C_6$–$C_{13}$ alkyl) acetate based upon 100% weight of total composition.

The dimethyl sulfoxide is a coupling agent and enhances the penetration of the composition into painted and coated substrates, thereby accelerating the removal of the paint and/or coating. The dimethyl sulfoxide also enhances the penetration of the composition into dirt on substrates. The composition typically comprises a penetration enhancing effective amount of dimethyl sulfoxide. The composition preferably comprises from about 3 to about 30% by weight and more preferably from about 10 to about 20% by weight of dimethyl sulfoxide based upon 100% weight of total composition.

The compositions of the present invention effectively remove paints and coatings from substrates, including polymeric substrates, such as polyacrylates, polycarbonates, polymrethanes, and other plastics, without hazing or clouding. In particular, the compositions of the present invention are very effective at removing grafitti paints and alkyd enamel paints from plexiglass and automotive finishes, such as polyurethane coatings, without damaging the plexiglass or automotive finishes. Some paints, however, contain harsh solvents, such as xylene and toluene, which cause permanent clouding and/or hazing of polymeric substrates upon contact. Substrates with such paints may remain opaque even after stripping with the paint stripper composition of the present invention, since the substrate was damaged prior to application of the paint stripper composition.

The compositions of the present invention also effectively clean various substrates, such as those mentioned above, without damaging the substrates.

The composition typically includes up to about 30% by weight of water, based upon 100% weight of total composition. Preferably, the composition contains less than about 5% by weight of water. More preferably, the composition is free of water. Preferably, the composition contains only one phase.

The composition may also include an aromatic ether having the formula $R^1$—$CH_2$—O—$CH_2$—$R^2$ where $R^1$ and $R^2$ are hydrogen and phenyl or both phenyl. A preferred aromatic ether is benzyl ether. The composition preferably includes from about 1 to about 10% by weight of aromatic ether based upon 100% weight of total composition. The weight ratio of aromatic alcohol to aromatic ether is preferably from about 3:1 to about 1:1 and more preferably about 2.5:1.

The composition may include other adjuvants, such as coupling agents, cosolvents, surfactants, accelerators, rheology modifying agents, and any combination of any of the foregoing.

Suitable coupling agents include, but are not limited to, alkylene glycols, propylene carbonate, and any combination of any of the foregoing. Preferred coupling agents include, but are not limited to, dipropylene glycol, propylene glycol, propylene carbonate, and any combination of any of the foregoing. The composition typically comprises from about 3 to about 20% by weight and more preferably from about 10 to about 15% by weight of coupling agent based upon 100% weight of total composition.

Suitable cosolvents include, but are not limited to, dipropylene glycol methyl ether, available as Arcosolv® DPM from Arco Chemical Canada Inc. of Scarborough, Ontario; 2-butoxyethanol, available as Glycol Ether EB™ from Union Carbide Corp. of Danbury, Conn.; and any combination of any of the foregoing. The composition typically comprises from about 30 to about 70% by weight and more preferably from about 30 to about 50% by weight of cosolvent based upon 100% weight of total composition.

Suitable surfactants include, but are not limited to, cationic surfactants, anionic surfactants, zwitterionic surfactants, amphoteric surfactants, nonionic surfactants, and any combination of any of the foregoing. The surfactant enhances the water rinseability of the paint stripper composition and residue from the substrate after the paint stripping has occurred. The surfactant also acts as a cleaning agent on the substrate. Preferably, the surfactant foams when rinsing the substrate after application of the composition of the present invention. Foaming enhances penetration of the composition into the substrate resulting in more effective removal of paint and coating residues as well as dirt. Preferred surfactants include, but are not limited to, nonionic surfactants, such as alcohol ethoxylate, nonyl phenol ethoxylate, and any combination of the foregoing. More preferably, the surfactant is alcohol ethoxylate. The composition typically comprises a cleaning effective amount of surfactant. Preferably, the composition comprises from about 0.1 to about 3% by weight and more preferably from about 0.5 to about 1.5% by weight of surfactant based upon 100% weight of total composition.

Suitable accelerators include, but are not limited to, alkanolamines, such as monoethanolamine. The composition typically comprises from about 0.1 to about 3% by weight and more preferably from about 0.5 to about 1.5% by weight of accelerator based upon 100% weight of total composition.

Suitable rheology modifying agents include, but are not limited to, thickeners, such as hydroxypropyl cellulose. According to one embodiment of the invention, the composition comprises a gel forming effective amount of thickener. The composition typically comprises from about 0.1 to about 3% by weight and more preferably from about 0.1 to about 1.0% by weight of rheology modifying agent based upon 100% weight of total composition.

Other adjuvants as known to those skilled in the art may also be included in the composition.

The paint stripper compositions of the present invention are prepared by admixing the aromatic alcohol, oxo-($C_6$–$C_{13}$ alkyl) acetate, dimethyl sulfoxide, and adjuvants.

Another embodiment of the present invention is a method for removing paint or a coating from a substrate comprising applying a paint or coating removing effective amount of a paint stripper composition comprising an oxo-($C_6$–$C_{13}$ alkyl) acetate to the substrate. The paint stripper composition typically comprises a substrate protective effective amount of an oxo—($C_6$–$C_{13}$ alkyl) acetate. The paint stripper composition preferably comprises from about 3 to about 50% by weight and more preferably from about 5 to about 15% by weight of an oxo—($C_6$–$C_{13}$ alkyl) acetate based upon 100% weight of total composition. A preferred paint stripper composition is the composition of the present invention. Typically, the composition is applied such that it completely covers the area of the substrate in which the paint or coating is to be removed. The paint stripper composition may need to be applied one or more times to remove one or more coatings from a substrate.

Examples of suitable substrates include, but are not limited to, polymeric substrates and coatings, including, but not limited to, plastics, such as polycarbonates, polyurethanes, and polyacrylates and in particular plexiglass; concrete; masonry; wood; and glass.

Methods of applying the stripper include, but are not limited to, spraying, soaking, immersing, brushing, and the like. Preferably, the substrate to be stripped is sprayed with the stripper composition of the present invention.

Yet another embodiment of the present invention is a method for cleaning a substrate, comprising applying a cleaning effective amount of the composition of the present invention to the substrate. Typically, the composition is applied such that it completely covers the area of the substrate to be cleaned. The composition may be applied to the aforementioned substrates and by the aforementioned methods.

The inventors have further discovered that the compositions of the present invention do not remove aircraft or automotive paints or coatings from metal substrates. As a result, the compositions of the present invention may be used to clean and/or remove paints and coatings from plexiglass parts, such as windows, on aircrafts and polyurethane coated automotive parts without effecting paints or coatings on these parts.

DESCRIPTION OF THE PREFERRED EMBODIMENTS

The following examples illustrate the invention without limitation. All parts and percentages are given by weight unless otherwise indicated.

Examples 1–4 and Comparative Example 1A

The liquid paint stripper compositions of Examples 1–4 and Comparative Example 1A in Table 1 were prepared by mixing the ingredients. All amounts in Table 1 are given in parts by weight.

TABLE 1

| | Examples | | | | Comparative |
|---|---|---|---|---|---|
| | 1 | 2 | 3 | 4 | Example 1A |
| Benzyl Alcohol | 9.90 | 9.90 | 9.90 | 9.90 | 9.90 |
| Dimethyl Sulfoxide | 14.85 | 14.85 | 14.85 | 14.85 | 14.85 |
| Oxo-nonyl Acetate[1] | | 9.90 | | | |
| Oxo-decyl Acetate[2] | 9.90 | | | 60.00 | |
| Oxo-($C_{13}$ Alkyl) Acetate[3] | | | 9.90 | | |
| Dipropylene Glycol Methyl Ether | 48.70 | 48.70 | 48.70 | 13.45 | 58.60 |
| Dipropylene Glycol | 14.85 | 14.85 | 14.85 | 14.85 | 14.85 |
| Alcohol Ethoxylate | 0.90 | 0.90 | 0.90 | 0.90 | 0.90 |
| Monoethanolamine | 0.90 | 0.90 | 0.90 | 0.90 | 0.90 |

[1] Oxo-nonyl acetate is available as Exxate 900 ™ from Exxon Chemical Co. of Houston, TX.
[2] Oxo-decyl acetate is available as Exxate 1000 ™ from Exxon Chemical Co. of Houston, TX.
[3] Oxo-($C_{13}$ alkyl) acetate is available as Exxate 1300 ™ from Exxon Chemical Co. of Houston, TX.

16 cast acrylic MEL-P-8184 plexiglass panels (4"×5") were tested as follows. One panel was designated as a control panel. 5 panels were sprayed with green grafitti paint, available as Krylon® Green Enamel from Krylon® Corp. of Solon, Ohio; 5 panels were sprayed with red grafitti paint, available as Krylon® Red Enamel; and 5 panels were sprayed with blue grafitti paint, available as Krylon® Blue Enamel. The 15 sprayed panels were cured for 30 days at room temperature (15–20° C.).

Each paint stripper composition was tested as follows. A green test panel was immersed in the paint stripper composition for 5 minutes. The test panel was then rinsed with water and dried. A visual evaluation was performed to determine the percentage of paint removed from the substrate and the condition of the substrate. This test was repeated with a red panel and a blue panel. The results are shown in Table 2 below.

TABLE 2

| | Green Panel | | Red Panel | | Blue Panel | |
|---|---|---|---|---|---|---|
| Paint Stripper Composition | Percentage of Coating Removed | Condition of Substrate | Percentage of Coating Removed | Condition of Substrate | Percentage of Coating Removed | Condition of Substrate |
| Example 1 | 100 | Clear | 100 | Opaque | 100 | Clear |
| Example 2 | 100 | Clear | 100 | Opaque | 100 | Clear |
| Example 3 | 100 | Clear | 100 | Opaque | 85 | Clear |
| Example 4 | 40 | Clear | 60 | Opaque | 85 | Clear |
| Comparative Example 1A | 100 | Opaque | 100 | Opaque | 100 | Opaque |

The paint stripper compositions of Examples 1–4 removed the paint from the green and blue panels without clouding or hazing the plexiglass substrate, while the paint stripper composition of Comparative Example 1A resulted in clouding of the plexiglass substrate. All of the paint stripper compositions removed the paint from the red panels, but left the plexiglass opaque. The inventor theorizes that the solvent of the red grafitti paint damaged the substrate upon application of the paint and, therefore, the plexiglass substrate appeared opaque even when stripped with one of the paint stripper compositions of the present invention.

All patents, applications, articles, publications, and test methods mentioned above are hereby incorporated by reference.

Many variations of the present invention will suggest themselves to those skilled in the art in light of the above detailed description. Such obvious variations are within the full intended scope of the appended claims.

What is claimed is:

1. A composition for cleaning and removing paints and coatings from substrates comprising:
   (a) an aromatic alcohol selected from the group consisting of
      (i) an aromatic alcohol having the formula

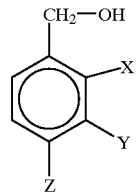

wherein X, Y, and Z are all hydrogen or two hydrogens and a methyl,
      (ii) an aromatic alcohol having the formula

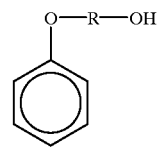

wherein R is ethylene, propylene, or isopropylene, and
      (iii) a mixture thereof;
   (b) an oxo-($C_6$–$C_{13}$ alkyl) acetate; and
   (c) dimethyl sulfoxide.

2. The composition of claim 1, wherein said aromatic alcohol is benzyl alcohol.

3. The composition of claim 1, wherein said composition comprises from about 3 to about 20% by weight of said aromatic alcohol based upon 100% weight of total composition.

4. The composition of claim 1, wherein said acetate is an oxo-($C_9$–$C_{11}$ alkyl) acetate.

5. The composition of claim 4, wherein said acetate is oxo-decyl acetate.

6. The composition of claim 1, wherein said composition comprises a substrate protective effective amount of said acetate.

7. The composition of claim 1, wherein said composition comprises from about 3 to about 50% by weight of said acetate based upon 100% weight of total composition.

8. The composition of claim 1, wherein said composition comprises from about 3 to about 30% by weight of dimethyl sulfoxide based upon 100% weight of total composition.

9. The composition of claim 1, further comprising an aromatic ether having the formula $R^1$—$CH_2$—O—$CH_2$—$R^2$ where $R^1$ and $R^2$ are hydrogen and phenyl or both phenyl.

10. The composition of claim 1, wherein said composition further comprises a coupling agent, cosolvent, surfactant, accelerator, rheology modifying agent, or mixture thereof.

11. The composition of claim 10, wherein said coupling agent is selected from the group consisting of an alkylene glycol, propylene carbonate, and mixture thereof.

12. The composition of claim 11, wherein said coupling agent is selected from the group consisting of dipropylene glycol, propylene glycol, propylene carbonate, and mixture thereof.

13. The composition of claim 10, wherein said cosolvent is selected from the group consisting of dipropylene glycol methyl ether 2-butoxyethanol, and mixture thereof.

14. The composition of claim 10, wherein said surfactant is anonionic surfactant.

15. The composition of claim 14, wherein said nonionic surfactant is selected from the group consisting of alcohol ethoxylate, nonyl phenol ethoxylate, and mixture thereof.

16. The composition of claim 10, wherein said accelerator is an alkanolamine.

17. The composition of claim 16, wherein said alkanolamine is monoethanolamine.

18. The composition of claim 1, wherein said composition is free of water.

19. The composition of claim 10, wherein said composition comprises from about 3 to about 20% by weight of coupling agent, from about 30 to about 70% by weight of cosolvent, from about 0.1 to about 3% by weight of nonionic surfactant, and from about 0.1 to about 3% by weight of accelerator, based upon 100% weight of total composition.

20. A paint stripper composition comprising:
    (a) from about 3 to about 20% by weight of benzyl alcohol;
    (b) from about 3 to about 50% by weight of oxo-decyl acetate;
    (c) from about 3 to about 30% by weight of dimethyl sulfoxide;
    (d) from about 3 to about 20% by weight of a coupling agent selected from the group consisting of dipropylene glycol, propylene glycol, and mixture thereof;
    (e) from about 30 to about 70% by weight of a cosolvent selected from the group consisting of dipropylene glycol methyl ether, 2-butoxyethanol, and mixture thereof;
    (f) from about 0.1 to about 3% by weight of alcohol ethoxylate; and
    (g) from about 0.1 to about 3% by weight of monoethanolamine, based upon 100% weight of total composition.

* * * * *